No. 789,595. PATENTED MAY 9, 1905.
L. & R. O. DUNCAN & A. R. INGRAM.
WATER FILTER.
APPLICATION FILED JAN. 16, 1905.
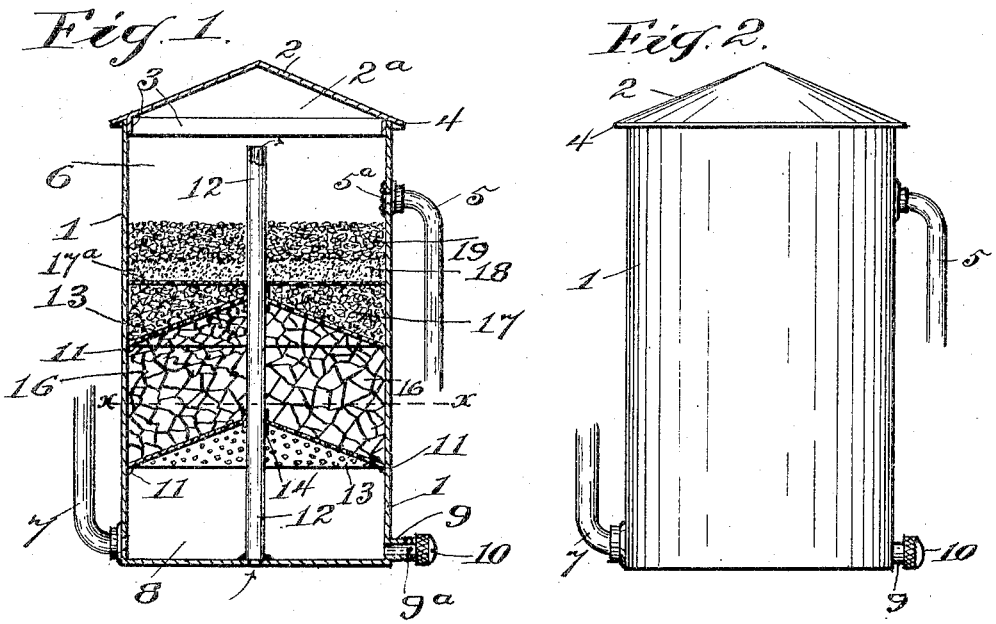
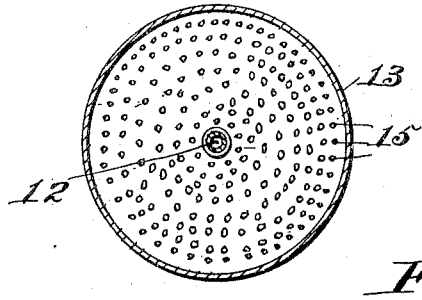
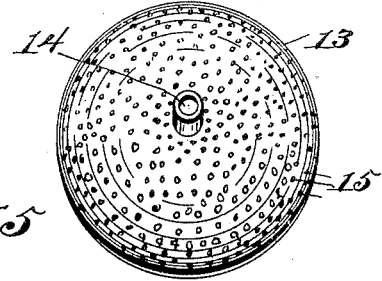
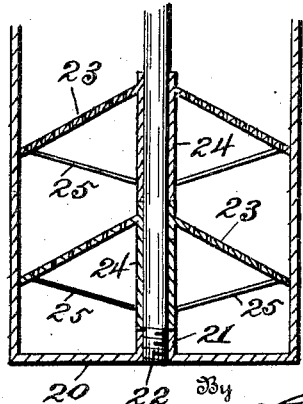
Witnesses
L. E. Money
V. H. Whitman
Inventors
Lindsey Duncan,
Richard O. Duncan,
Arthur R. Ingram
By C. J. Belt
Attorney No. 789,595. Patented May 9, 1905.

UNITED STATES PATENT OFFICE.

LINDSEY DUNCAN, RICHARD O. DUNCAN, AND ARTHUR R. INGRAM, OF LAGRANGE, KENTUCKY.

WATER-FILTER.

SPECIFICATION forming part of Letters Patent No. 789,595, dated May 9, 1905.

Application filed January 16, 1905. Serial No. 241,373.

*To all whom it may concern:*

Be it known that we, LINDSEY DUNCAN, RICHARD O. DUNCAN, and ARTHUR R. INGRAM, citizens of the United States, residing at Lagrange, in the county of Oldham and State of Kentucky, have invented certain new and useful Improvements in Water-Filters, of which the following is a specification.

This invention relates to water filtration, and pertains especially to the class of cistern and hydrant water-filters having granular beds.

The prime object of the invention is to provide a filter with an open-end air-pipe extending through a series of filtering-beds and through the water contained in the filter for the purpose of purifying the water.

A further object of the invention is to provide a filter with perforated removable cone-rests for filtering-beds having a central aperture through which an air-pipe extends from the bottom to the top of the filter, and to provide a strainer between certain of such filtering-beds. It is well known that this class of filters when closed up for any length of time become unclean and often emit disagreeable and unhealthy odors. It is therefore the purpose of this invention to overcome these objections and disadvantages and to furnish a filter the bed-bottoms of which are readily removable and to supply means for introducing air into the filter carrying off foul air from the filter.

With these and various other objects in view the invention consists in the novel construction of parts, and particularly in the arrangement of an air-pipe within a filter, for the purposes herein described.

In the accompanying drawings, forming part of this application, Figure 1 is a vertical sectional view showing a filter embodying the invention. Fig. 2 is a side elevation. Fig. 3 is a cross-section on the line $x\,x$, Fig. 1. Fig. 4 is a detail perspective view of one of the perforated cones. Fig. 5 is a sectional view of a modification.

The same numeral references denote the same parts throughout the several views of the drawings.

The filter shell or cylinder 1 is preferably composed of thin sheet metal. The top or cover 2 is cone-shaped and of the same metal or heavier, if desirable, and has an annular flange or rim 3 to fit tightly within the cylinder-top with an overhanging ledge 4, so as to thoroughly protect the joint between the cover and the cylinder and to form an air-chamber $2^a$.

The upper part of the cylinder 1 is provided with an overflow-pipe 5, having a strainer $5^a$ and leading from a water-chamber 6 to the cistern or other receptacle, and the lower part of the cylinder has a water-supply pipe 7 from a house or other source to a water-supply chamber 8. This chamber 8 is provided with a nipple 9, having an aperture $9^a$ and a screw-cap 10 for drainage. The cylinder is provided with annular rests or supports 11.

Secured to and opening through the bottom of the cylinder 1 is an air-pipe 12, extending centrally through the cylinder and terminating in an open end above the water-line of the chamber 6, so that a free and unobstructed air-channel is formed central of the cylinder for the purpose of conducting foul air from the cylinder and to prevent the water in the cylinder from freezing to such an extent as to burst or crack the cylinder. It has been found that the pipe will prevent or at least retard freezing of the water in the cylinder, so that the latter is not injured on account of freezing water. This results from the introduction of the pipe into the body of water and from the passage of air-currents through the pipe.

Two or more cones 13 are slidable within the cylinder and have a central aperture 14 to permit them to be slid over the air-pipe and seated on the rests 11 and removed therefrom. These cones have perforations 15, and the bottom cone supports a charcoal bed 16 and forms the top of the chamber 8, while the upper cone forms a cover for the charcoal and supports a bed of coarse sand or gravel 17, upon which is a layer of fine sand 18, separated from the bed 17 by a strainer $17^a$, of fine-wire mesh, and upon the layer 18 is the final or top bed 19 of coarse gravel.

The perforated cones not only afford free circulation of water, but their shape prevents them sagging or buckling under the weight of the beds, as it will be seen that they may become braced between the shell or cylinder and the air-pipe under such weight. These cones also have a greater water-surface and permit the water to be discharged therefrom over a greater area of bed-bottom than the ordinary filter.

The cone top or cover forms an air-chamber into which the air-pipe opens at one end, and its other end opens through the bottom of the shell or cylinder, thereby forming an air-channel from the outside to the inside of the filter.

We do not wish to confine ourselves to any particular material, size, or shape of the filter, nor to the special location of the cones, as the latter being movable may be adjusted relative to each other as desired. Neither do we wish to be restricted in the manner of connecting the air-pipe to the bottom of the filter, for while we have shown it soldered thereto it may be otherwise attached in the practical application of the same.

Referring to the modification shown in Fig. 5, the filter-bottom 20 has a central screw-nipple 21, into which the air-pipe 22 is set, and the cones 23 are provided with a collar 24 and braces 25, extending from the periphery of the cones to the collars. By this arrangement no ledges or cone-supports are necessary on the shell or cylinder, and the upper collar rests on the apex of the lower cone, and the lower collar rests on the nipple 21. In this form the cones may be removed separately or together with the pipe.

Having thus described our invention, what we claim as new, and desire to secure by Letters Patent, is—

1. In a cistern and hydrant filter, the combination, with the shell or cylinder having suitable induction and discharge water-pipes, and a cone-shaped cover, of the perforated cones removably carried by the cylinder, and the filtering-beds supported by the cones and having a central air-duct therethrough.

2. In a cistern and hydrant filter, the combination, with the shell or cylinder having suitable induction and discharge water-pipes, and the filtering-beds, of an air-pipe extending from the bottom of the cylinder and terminating above the water-line of the filter, substantially as and for the purpose set forth.

3. The combination, with the filter shell or cylinder, and an open-end air-pipe supported by the bottom of the cylinder and extending centrally therethrough, of the perforated cones having a central aperture to permit them to slide on the air-pipe.

4. In a cistern and hydrant water-filter, the combination, with the shell or cylinder having a bottom water-chamber, a perforated cone forming the top of the chamber, a cone-shaped cylinder-cover forming an air-chamber, a strainer, and a perforated cone interposed between the strainer and the said chamber-cone, of an air-pipe extending through the strainer and the cones and having one end open through the bottom of the water-chamber and the other end opening into the said air-chamber, and suitable filtering-beds supported by the strainer and the cones, substantially as and for the purpose set forth.

In witness whereof we hereunto set our hands in the presence of two witnesses.

LINDSEY DUNCAN.
  RICHARD O. DUNCAN.
  ARTHUR R. INGRAM.

Witnesses:
 J. R. CLARK,
 T W. DUNCAN.